US012607297B2

(12) United States Patent
Masias et al.

(10) Patent No.: US 12,607,297 B2
(45) Date of Patent: Apr. 21, 2026

(54) UNIVERSAL MOUNTING BRACKET

(71) Applicant: Emerson Process Management Regulator Technologies Inc., McKinney, TX (US)

(72) Inventors: Justin L. Masias, Tom Bean, TX (US); Anthony Amaro, McKinney, TX (US); Arrchana Lakshmanan, McKinney, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 216 days.

(21) Appl. No.: 18/646,621

(22) Filed: Apr. 25, 2024

(65) Prior Publication Data

US 2024/0360953 A1 Oct. 31, 2024

Related U.S. Application Data

(60) Provisional application No. 63/498,170, filed on Apr. 25, 2023.

(51) Int. Cl.
*F16M 13/02* (2006.01)

(52) U.S. Cl.
CPC .................................... *F16M 13/02* (2013.01)

(58) Field of Classification Search
CPC ............................. F16M 13/02; F16M 13/022
USPC .................................. 248/74.5, 219.1, 316.8
See application file for complete search history.

(56) References Cited

U.S. PATENT DOCUMENTS

| | | | | |
|---|---|---|---|---|
| 5,031,864 A * | 7/1991 | Krol | .......................... | F16L 3/04 |
| | | | | 248/912 |
| 5,054,741 A * | 10/1991 | Ismert | ...................... | F16L 3/04 |
| | | | | 248/74.5 |
| 8,882,059 B2 * | 11/2014 | Schmidt | ............... | F16L 3/1041 |
| | | | | 248/65 |
| 9,458,974 B2 * | 10/2016 | Townsend, Jr. | ....... | F21V 21/116 |
| 2017/0335881 A1 * | 11/2017 | Briggs | ................. | A47G 25/743 |
| 2024/0110584 A1 * | 4/2024 | Finkelstein | .......... | F16M 13/022 |

* cited by examiner

*Primary Examiner* — Bradley Duckworth
(74) *Attorney, Agent, or Firm* — Quarles & Brady LLP

(57) ABSTRACT

A mounting bracket to secure an object to a pipe can include a bracket body with sets of contact surfaces arranged to engage pipes having different diameters. Mounting blocks can secure an objects to the bracket body. Channel structures can receive straps to secure the bracket body to the pipes.

20 Claims, 19 Drawing Sheets

UNIVERSAL MOUNTING BRACKET

CROSS-REFERENCE TO RELATED APPLICATIONS

This application claims priority to and incorporates herein by reference U.S. Provisional Patent Application 63/498,170, filed Apr. 25, 2023.

BACKGROUND

Auxiliary devices for regulators or valves may need to be securely held in place to ensure proper function. Auxiliary devices can include pilot valves, transmitters, controllers, electronic instrumentation (e.g., with corresponding enclosures) and other devices.

SUMMARY

Generally, embodiments of the invention can provide a mounting bracket to secure auxiliary devices and other objects, relative to different sizes of pipe or other round bodies.

Some embodiments provide a mounting bracket to secure an object to a pipe. The mounting bracket can include a bracket body that includes a first set of contact surfaces, a second set of contact surfaces, mounting blocks, a first channel structure, and a second channel structure. The first set of contact surfaces can include first rounded contact profiles that protrude to a first side of the bracket body and are spaced to simultaneously engage a pipe with a first diameter. The second set of contact surfaces can include second rounded contact profiles that protrude to a first side of the bracket body and are spaced to simultaneously engage a pipe with a second diameter smaller than the first diameter. The mounting blocks can be arranged to secure the object to a second side of the bracket body that is opposite the first side. The first channel structure can be configured to receive a strap to secure the bracket body to a pipe with the bracket body in a first orientation. The second channel structure can extend transverse to the first channel structure and is configured to receive a strap to secure the bracket body to a pipe with the bracket body in a second orientation different from the first orientation.

Some embodiments provide a method of securing an object to a pipe. A mounting bracket (e.g., as described above) can be selectively aligned so that one of: first rounded contact profiles are seated on a first pipe having the first diameter, or second rounded contact profiles are seated on a second pipe having the second diameter. The mounting bracket can be secured to one of the first or second pipe, respectively, with a strap that extends through one of the first or second channel structures, respectively. An object to be supported can be secured to mounting blocks of the mounting bracket.

Some embodiments provide a method forming a mounting bracket. The method can include integrally forming a bracket body of a mounting bracket to secure an object to pipes of different diameters (e.g., as described above).

Some embodiments provide a mounting bracket to secure an electrical enclosure to a pipe. The mounting bracket can include a first set of contact surfaces, a second set of contact surfaces, mounting blocks, a first channel structure, and a second channel structure. The first set of contact surfaces can include protrusion that create a first contact profile. The second set of contact surfaces can include a second rounded contact profile. The mounting blocks can be arranged to secure the object to a side of the bracket body that is opposite the side with protrusions. The first channel structure can be configured to receive a strap to secure the bracket body to a pipe with the bracket body in a first orientation. The second channel structure can extend transverse to the first channel structure and is configured to receive a strap to secure the bracket body to a pipe with the bracket body in a second orientation perpendicular from the first orientation.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
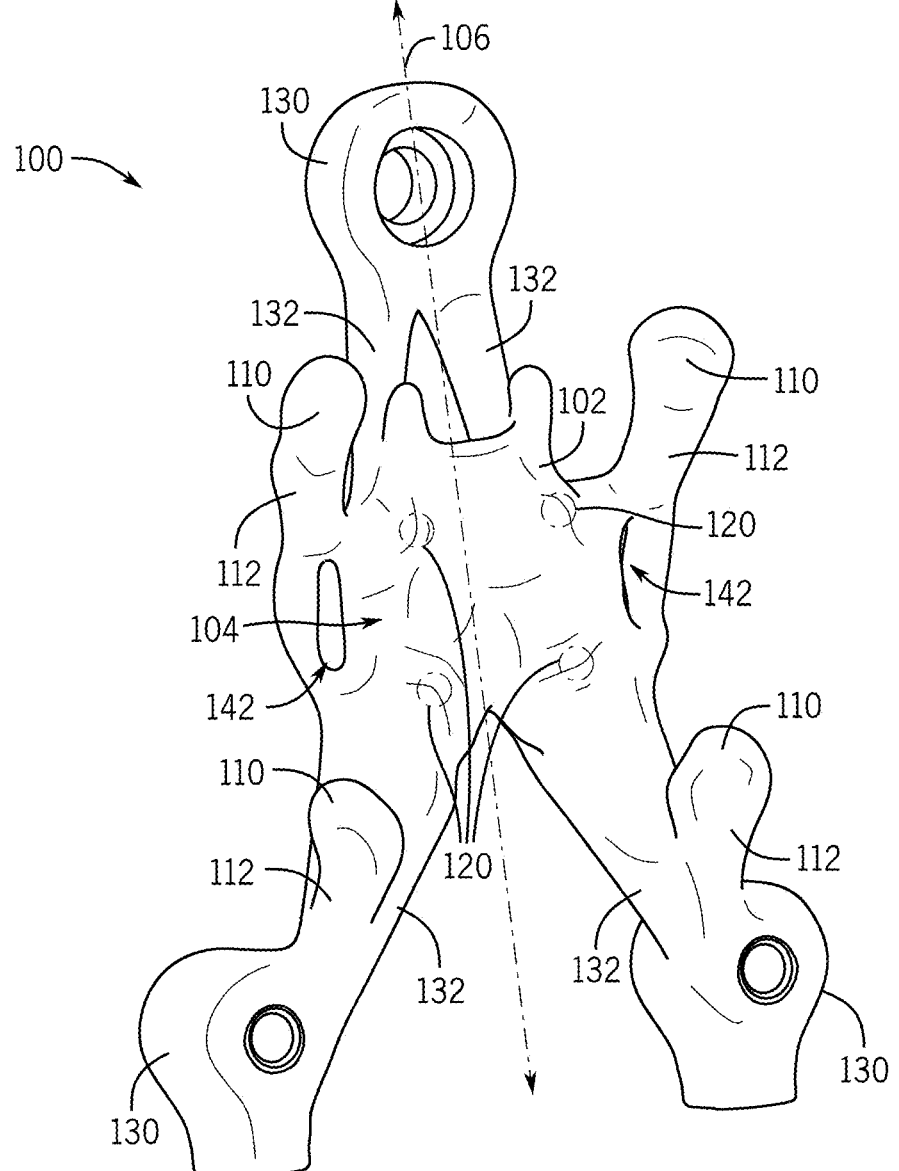
FIG. 1 is a first-side axonometric view of a mounting bracket according to an example of the disclosed technology.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As briefly discussed above, auxiliary devices for regulators, valves, or other equipment may need to be securely held in place to ensure proper function. Auxiliary devices can include, for example, pilot valves, transmitters, controllers, electronic instrumentation, etc. Mounting auxiliary devices directly to existing products can be challenging because surface geometry and bolt patterns can vary significantly between products. Accordingly, some conventional approaches may require brackets that are custom designed for particular products—e.g., with customized structures to align with existing bolt patterns, or with existing external threads. However, the need to customize brackets to particular applications may be resource-intensive and may significantly complicate inventory management. Other conventional approaches may employ stands to support an auxiliary device independent of an existing product. However, the stands can be cumbersome and may impose spatial requirements that limit the placement of the auxiliary device.

Examples of the disclosed bracket can address these and other issues by providing a more universal design for securing a wide range of auxiliary devices in a wide range of applications. In particular, some examples of the disclosed bracket can include separate sets of contact surfaces that are adapted to securely seat on different sizes of pipes (or other objects). Further, some examples can be configured to be easily secured in different orientations on a particular pipe, so as to flexibly support an auxiliary device in any of multiple orientations. Thus, examples of the disclosed technology can allow auxiliary devices of a wide range of types to be easily secured to the cylindrical piping associated with almost all process equipment.

Figure 2:
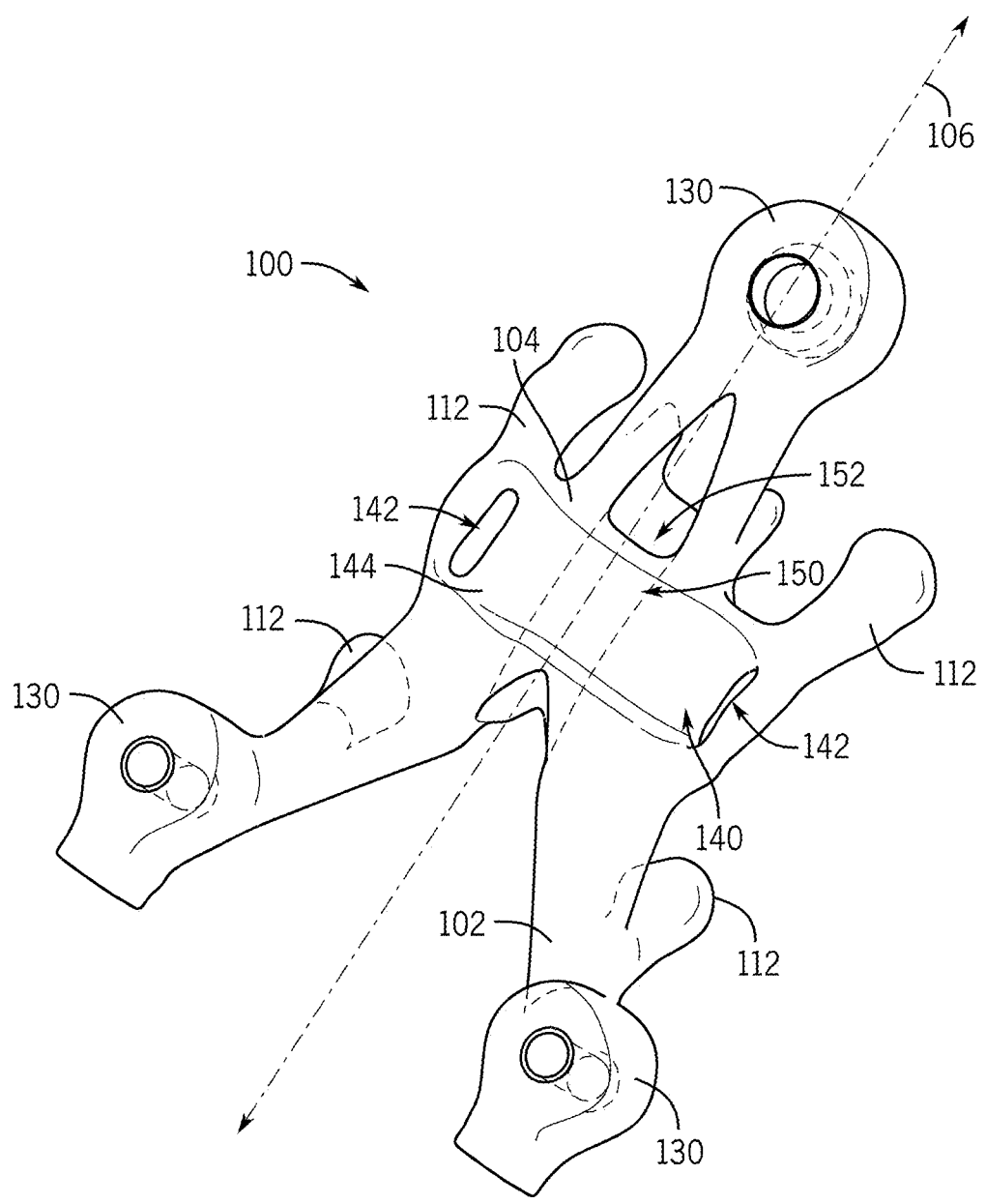
FIG. 2 is a second-side axonometric view of the mounting bracket of FIG. 1, with the mounting bracket rendered partly transparently to show internal structures.

FIGS. 1 and 2 illustrate an example mounting bracket 100 according to the disclosed technology. In particular, the bracket 100 as shown includes a single-piece bracket body 102 that is integrally formed using metal additive manufacturing, although other examples can be investment cast or otherwise formed.

Generally, the disclosed mounting brackets can include separate sets of contact surfaces to engage different pipes. For example, as shown in FIG. 1 in particular, the bracket 100 includes a first set of contact surfaces 110 that protrude to a (first) side of the bracket body 102 to define first rounded contact profiles and a second set of contact surfaces 120 that protrude to the same (first) side of the bracket body 102 to define second rounded contact profiles. As further discussed below, the contact surfaces 110 are spaced apart from each other to simultaneously engage a pipe with a first (larger) diameter and the contact surfaces 120 are spaced apart from each other to simultaneously engage a pipe with a second (smaller) diameter.

In different examples, different spacings and curvatures for various contact surfaces can be possible. Generally, however, the contact surfaces of a first set can be separate from each other by a larger spacing than contact surfaces of a second set (i.e., as measured at a most-protruding contact point). Thus, for example, the first-set contact surfaces can more stably engage a pipe with a larger diameter and the second-set contact surfaces can more stably engage a pipe with a smaller diameter.

In particular, in the illustrated example, the first contact surfaces 110 are supported on first arms 112 that protrude from a main body 104 of the bracket body 102 to the first side of the bracket body. Thus, for example, the first contact surfaces 110 can be spaced relatively widely apart from each other, without substantial addition of material to the bracket body 102. In contrast, the second contact surfaces 120 protrude as continuous topographical contours of the main body 104. Thus, the second contact surfaces 120 can be spaced relatively closely together. In the illustrated example, the arms 112 are symmetrically arranged and angle away from the main body 104 in the illustrated example, and the first and second contract surfaces 110, 120 are also symmetrical about a longitudinal centerline of the main body 104. This configuration in particular can provide improved strength and adaptability to different pipes and installed orientations, as well as generally simple installation operations for users (e.g., relative to alignment and securement of the bracket 100). In other examples, however, other configurations are possible.

Further in the illustrated examples, each of the four respective contact profiles of the contact surfaces 110, 120 is formed as spherical surfaces (i.e., as surfaces that at least partly include a spherical contour) to provide secure and adaptable contact with a variety of pipe diameters and with the bracket body 102 in a variety of orientations. In other examples, other arrangements are possible, however, including with otherwise configured (e.g., otherwise curvedly convex arrangements).

Continuing with reference to FIG. 1, in particular, the first contact surfaces 110 are spaced apart from each other to define four contact points in the shape of a square (i.e., a first contact square) to engage a larger pipe. Similarly, the second contact surfaces 120 are spaced apart from each other to define four contact points also in the shape of a square (i.e., a second contact square) to engage a smaller pipe. Further, to provide a more contact overall arrangement, the second contact square is enclosed within the first contact square, from a perspective along a radial direction defined by a pipe that is seated on either of the contact surfaces 110, 120 (see, e.g., FIGS. 3A and 3B). This arrangement can also help with ease and adaptability of installation, alone or in combination with the configuration of the arms 112 or the body 104 generally.

In some cases, use of four contact points per set of contact surfaces can allow for secure attachment to a variety of objects (e.g., pipes of a variety of diameters) with the bracket body 102 adaptably arranged in various relative orientations (e.g., along or transverse to a pipe axis, as shown in FIGS. 3A through 5). In this regard, although the contact surfaces 110 and 120 are spaced as squares, other arrangements may include other rectangular configurations. Further, in other examples, different polygons or other relative locations can be defined by otherwise spaced arrays of either sets of the contact surfaces 110, 120. For example, some arrangements may define fewer than four contact points per set of contact surfaces, contact points that are not arranged in rectangles (e.g., squares), or as nested rectangles (e.g., squares) as shown, or contact points that are otherwise varied from the illustrated examples.

Mounting brackets according to the disclosed technology can also generally include a variety of mounting features that are arranged to secure an object to the brackets. In particular, for example, the bracket 100 includes mounting blocks 130 that protrude to a (second) side of the bracket body 102 that is opposite the (first) side that includes the contact surfaces 110, 120). In particular, as shown in FIGS. 1 and 2, the mounting blocks 130 are formed as integral cylindrical bosses, supported on arms 132 that protrude in three lateral directions from the main body 104 of the bracket body 102, as well as radially (from the perspective of an attached pipe) away from the contact surfaces 110, 120. Thus, for example, the mounting blocks 130 can be threaded (e.g., tapped after 3D printing, etc.) or otherwise configured to be securable to a relevant auxiliary device, and can thereby rigidly secure the auxiliary device relative to a pipe engaged by the relevant contact surfaces 110, 120. In other examples, however, other configurations are possible, including mounting blocks formed as differently shaped bosses, as hooks or clasps, as channel structures for engagement with a strap to secure an auxiliary device, or otherwise.

Continuing, to allow easy and secure attachment to pipes, mounting brackets according to the disclosed technology can also generally include channel structures that can receive a strap (e.g., a strap-style pipe clamp). For example, as shown in FIG. 2 in particular, the bracket 100 includes a channel structure 140 configured to receive a strap to secure the bracket body to a pipe with the bracket body in a second orientation. The bracket 100 also includes a channel structure 150 that extends transverse to the channel structure 140 and is configured to receive a strap to secure the bracket body to a pipe with the bracket body in a different orientation than the channel structure 140 (e.g., a first orientation, perpendicular to a second orientation that corresponds to the channel structure 140, as shown). In other embodiments, other numbers or orientations of channel structures are also possible, to allow alternative or additional mounting orientations.

As shown in FIGS. 1 and 2, the channel structures 140, 150 can each define one or more channels (e.g., on an opposite side of the bracket body 102 from the contact surfaces 110, 120). Accordingly, a pipe strap received into either of the channel structures 140, 150 and tightened around a pipe can strongly urge the relevant contact surfaces 110, 120 into seated engagement with the pipe (as also discussed below). In particular, the channel structure 140 defines separate closed side channels 142 that extend through two of the arms 112 that support the contact surfaces 110, and a recessed groove 144 (i.e., an open channel) that extends between the channels 142 to receive a strap that extends through the loops defined by the channels 142. In contrast, the channel structure 150 defines a single internal channel 152 that extends through the main body 104, transverse to and across the groove 144 of the channel structure 140. In other examples, however, other configurations are possible, including with otherwise defined internal channels, recessed grooves, channels through various arms of a bracket body, and so on. For example, the longitudinal channel structure 150 can instead include an open channel similar to the recessed groove 144, or the transverse channel structure 140 can include a closed channel similar to the channel 152.

Figure 3A:
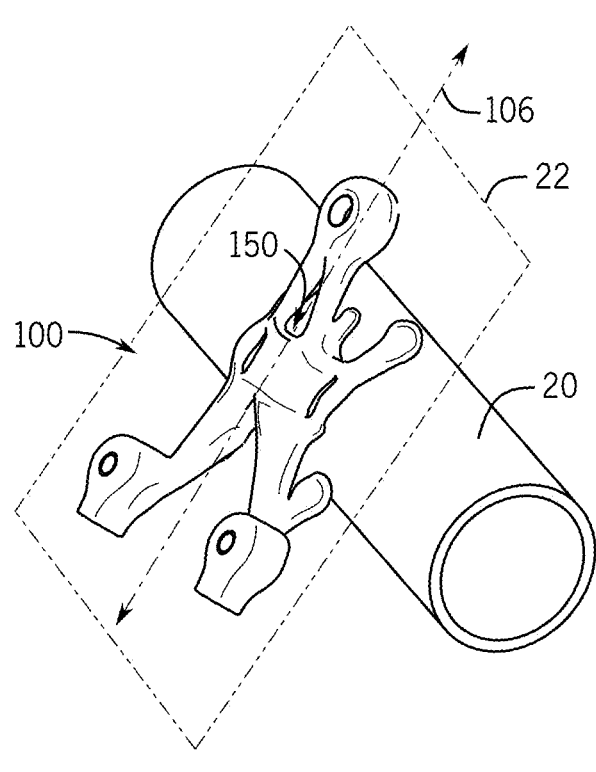
FIGS. 3A and 3B are isometric views of the mounting bracket of FIG. 1, secured in a first orientation to pipes with different diameters.
Figure 3B:
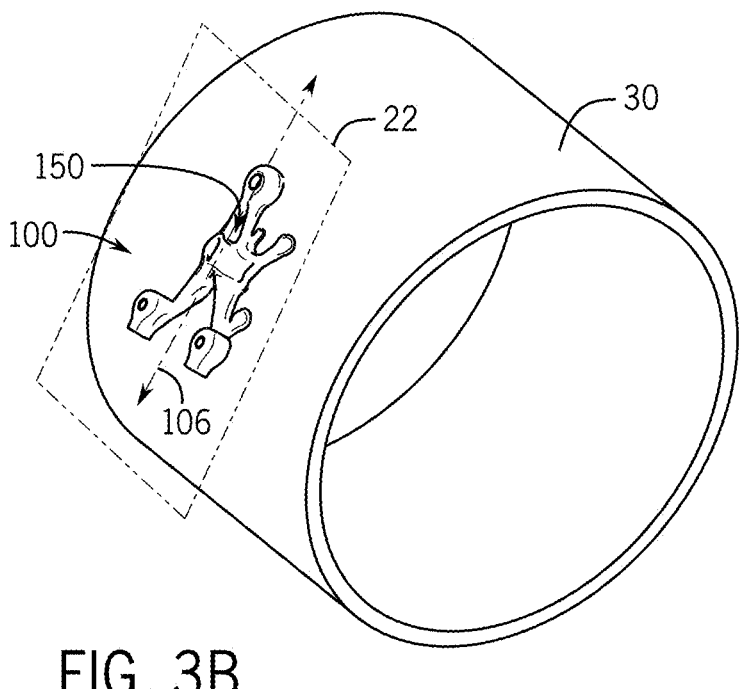

As also generally discussed above, the mounting bracket 100 can be adaptably secured to pipes of a variety of sizes, with the mounting bracket 100 in a variety of orientations, to support auxiliary devices of a variety of types (e.g., a wall 22 of an electrical enclosure, as schematically illustrated in FIGS. 3A and 3B). As shown in FIG. 3A, for example, a central (e.g. bisecting) axis 106 of the bracket 100 can be (selectively) oriented transverse to an axis of a smaller-diameter pipe 20 (e.g., a 2-inch pipe), with the second contact surfaces 120 (see FIG. 1) seated on the pipe 20. This arrangement can securely locate and support the bracket 100 and any attached auxiliary device (e.g., an enclosure, via the wall 22, as shown).

Similarly, as shown in FIG. 3B, the central axis 106 of the bracket 100 can be (selectively) oriented transverse to an axis of a larger pipe 30 (e.g., a 12-inch pipe), with the first contact surfaces 110 (see FIG. 1) seated on the pipe 30 to securely locate and support the bracket 100 and any attached auxiliary device (not shown, but attachable before or after securing the bracket 100 in place). In either case, a pipe strap (not shown in FIGS. 3A and 3B) that extends through the channel structure 150 and around the relevant pipe 20, 30 can then be tightened to appropriately secure the bracket 100 for service. In different examples, a pipe strap can be engaged with the bracket 100 before or after the bracket is seated on a pipe, and an auxiliary device can likewise be secured to the bracket 100 before or after the bracket is seated on or secured to a pipe.

Figure 4:
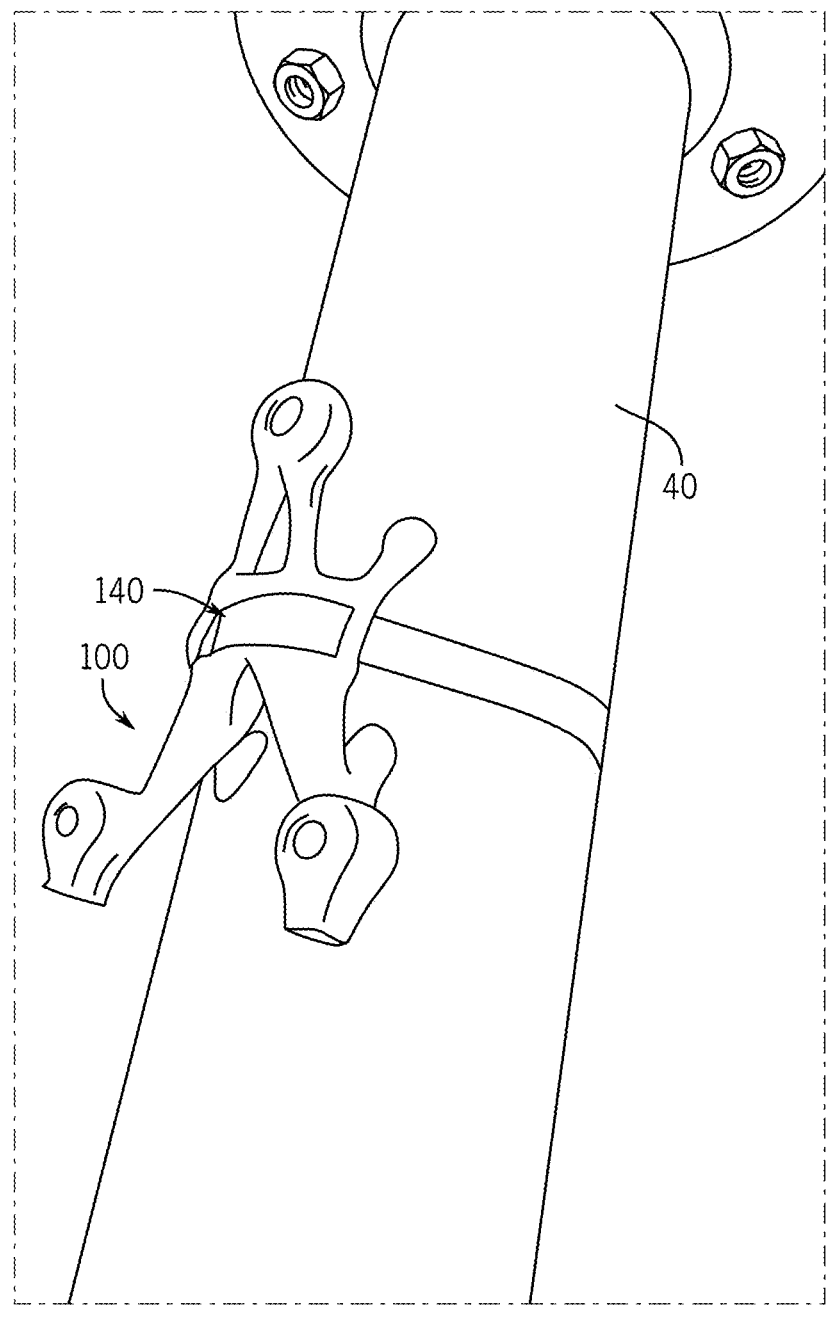
FIG. 4 is an axonometric view of the mounting bracket of FIG. 1, secured in a second orientation to a pipe.

Although shown in FIGS. 3A and 3B in particular transverse orientations (relative to the axes of the pipes 20, 30), other orientations are also possible. For example, as shown in FIG. 4, a pipe strap can extend through the channel structure 140 to secure the bracket 100 to a pipe 40 with the bracket 100 in a parallel orientation, relative to the pipe axis.

In some cases, a central axis can pass between particular contact surfaces. For example, as shown in FIG. 1, first sets of the contact surfaces 110, 120 (e.g., two of the surfaces 110, or two of the surfaces 120) can be on one side of the central axis, and second sets of the contact surfaces 110, 120 (e.g., two of the surfaces 110, or two of the surfaces 120) on an opposite side of the central axis. In some cases, a central axis can one or more of pass through at least one of the mounting blocks 130, or pass between a set of two of the mounting blocks.

Figure 5A:
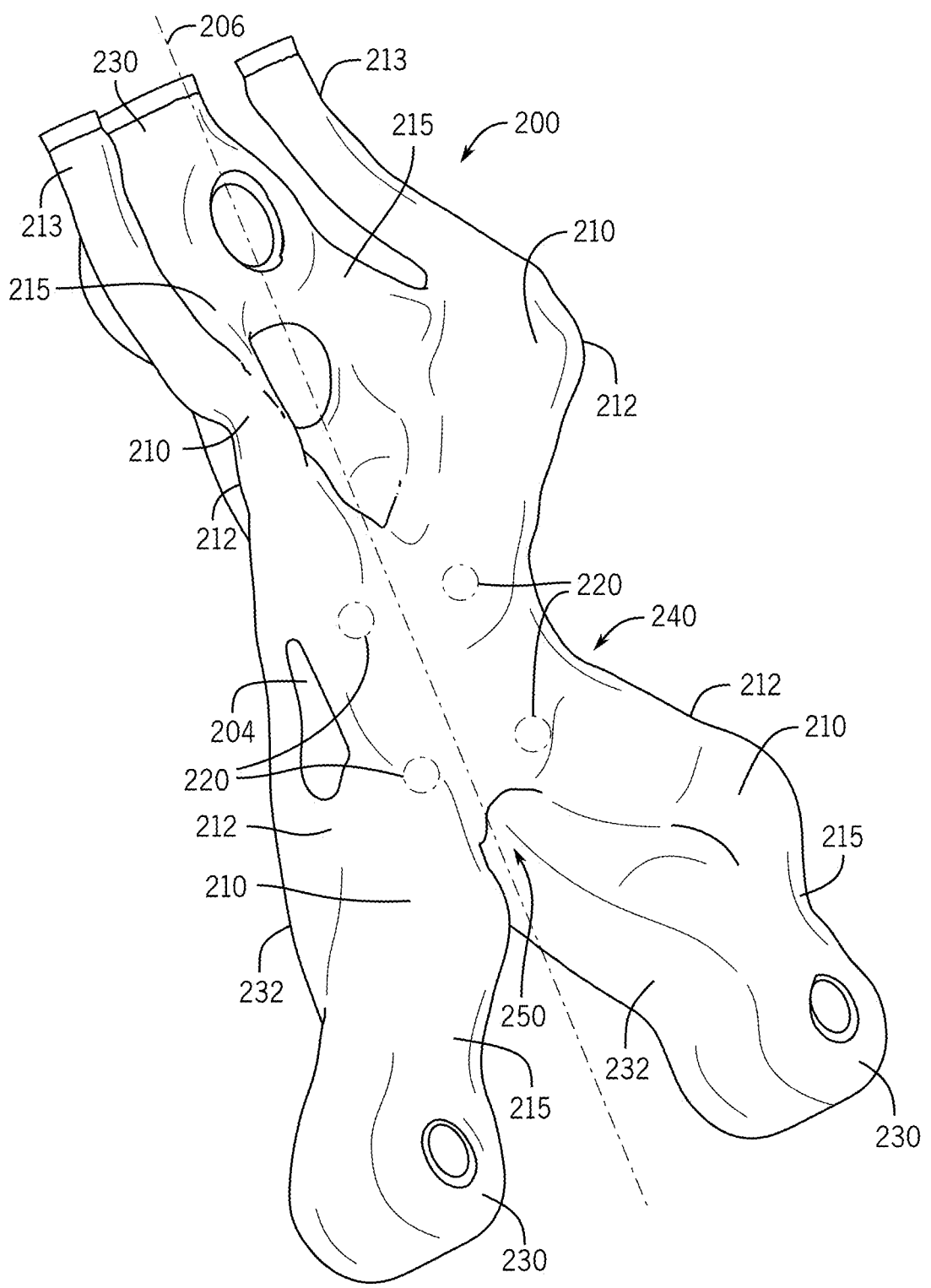
FIGS. 5A and 5B are first-side and second-side axonometric views of another configuration of the mounting bracket of FIG. 1.
Figure 5B:
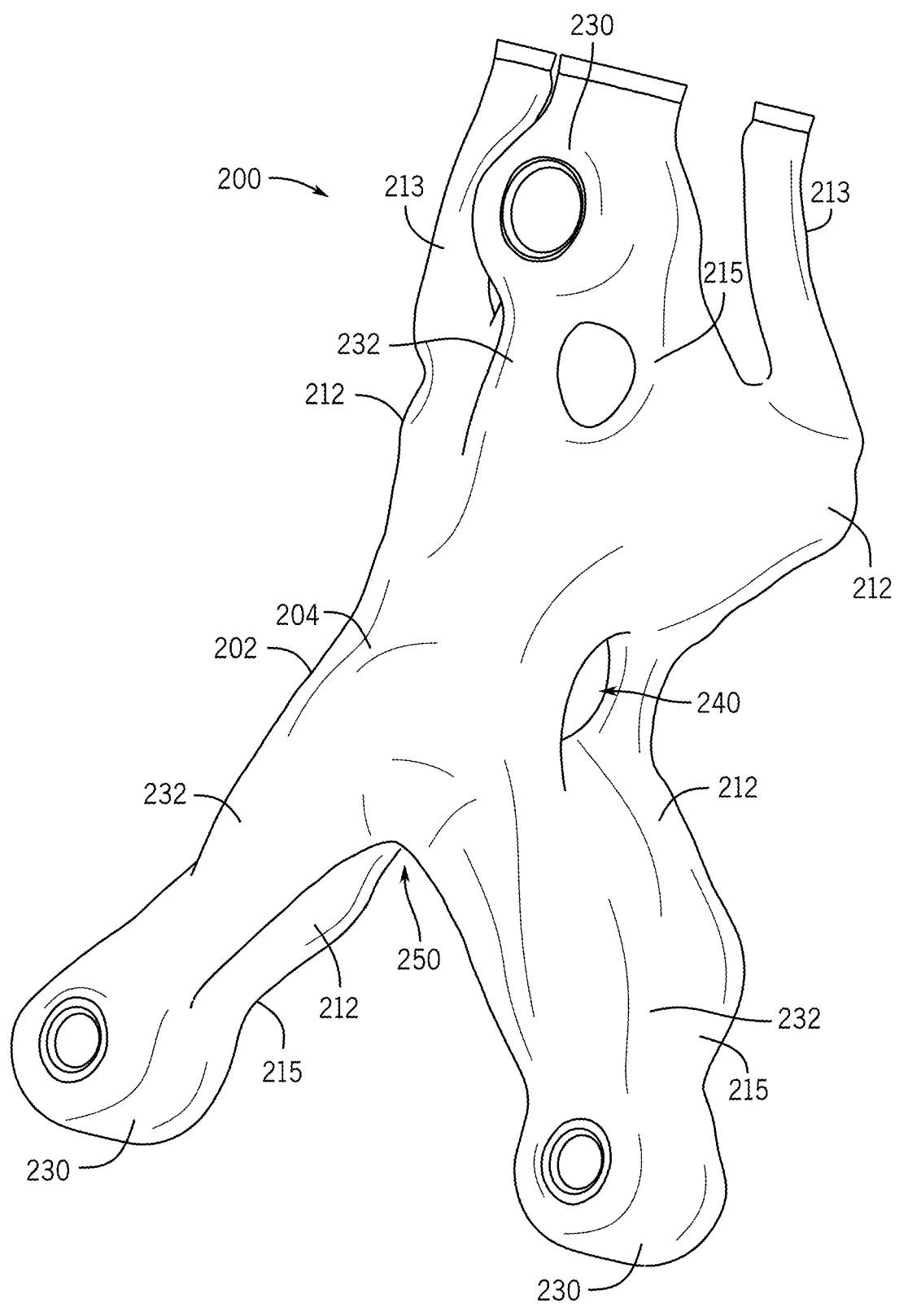
Figure 5C:
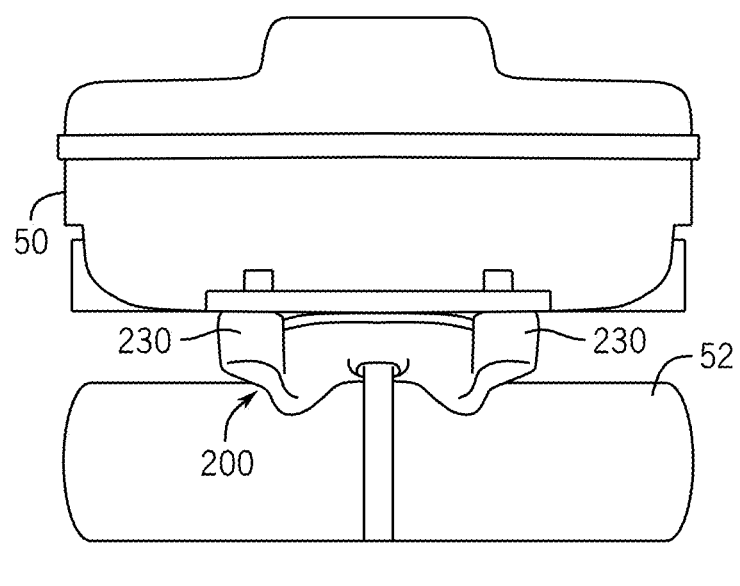
FIGS. 5C and 5D are views of the mounting bracket of FIGS. 5A and 5B arranged to secure an electrical enclosure to a pipe.
Figure 5D:
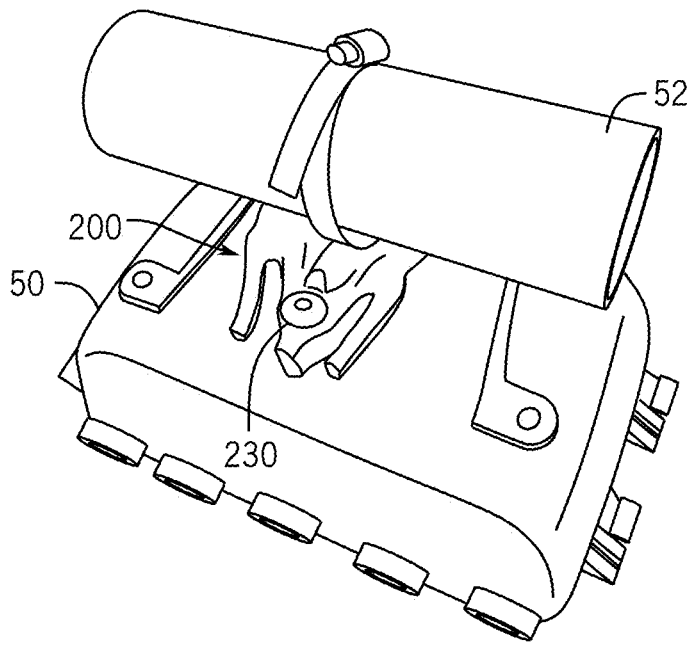

FIGS. 5A and 5B illustrate another configuration of the mounting bracket 100, indicated as mounting bracket 200. Accordingly, discussion of the mounting bracket 100 above also generally applies to similarly oriented or numbered (in the 200 series) components of the mounting bracket 200, and vice versa, including relative to an integrally (e.g., additively) formed bracket body 202, with a main body 204 having a central axis 206, channel structures 240, 250, arms 212, 232, contact surfaces 210, 220, and mounting blocks 230. Correspondingly, as discussed relative to the mounting bracket 100, the mounting bracket 200 can be used to adaptably mount various devices to pipes or other objects (e.g., as shown in FIGS. 5C and 5D), with the contact surfaces 210, 220 variously engaged.

In some respects, the mounting bracket 200 differs from the configuration of the mounting bracket 100 illustrated in FIG. 1. For example, as illustrated in FIGS. 5A and 5B, a set of the arms 212 of the mounting bracket 200 can include extensions that extend beyond the contact surfaces 210. For example, as shown in FIG. 5A, a set of the arms 212 can include extension 213 that extend away from the main body 204 to free ends. Thus arranged, for example, the extensions 213 can allow for easier handling of the mounting bracket 200, provide additional support for stably securing the mounting bracket to a pipe or other object, or allow for fewer post-processing operations (e.g., cutting, grinding, drilling, threading, etc. for an additively manufactured body).

Further, some extensions can supplement one or more of the arms 232 in supporting one or more of the mounting blocks 230. In this regard, for example, a set of the arms 212 can include extensions 215 that extend beyond the contact surfaces to intersect or otherwise support a corresponding one of the mounting blocks 230 (e.g., as shown, as struts to supplement the support of the arms 232). Thus, for example, one or more (e.g., each) of the mounting blocks 230 can be supported by a structure with multiple support members (e.g., with multiple struts, as variously shown with sets of the arms 232 and extensions 215 in FIGS. 5A and 5B).

As another example, the channel 240 of the mounting bracket 200 is fully enclosed within the main body 204, in contrast to the channel 140, which is exposed along one side of the main body 104 (see, e.g., FIGS. 2 and 4). Correspondingly, a strap received through the channel 240 may be relatively more protected from the surrounding environment and relative more material may be used (locally) in that regard by the main body 204, with corresponding effects on overall strength and weight distribution. Enclosing channels with material can also add rigidity for higher load applications and can support other surfaces during manufacturing. In some examples, however, open channels can be used to aid in on-site assembly and reduce overall material costs.

As noted above, various mounting features can be used to secure auxiliary devices to a bracket. As one example, as shown in FIGS. 5C and 5D, the mounting blocks 130 can be secured to an electrical enclosure 50 with threaded fasteners, and can thereby secure the enclosure 50 to a pipe 52 (or other structure). In other examples, however, other similar or different devices can be similarly or otherwise secured to a mounting bracket to be thereby secured to a pipe. For example, non-threaded fasteners of various known types can be used in some cases, with corresponding modifications (as needed) to particular mounting blocks 230.

Figure 6A:
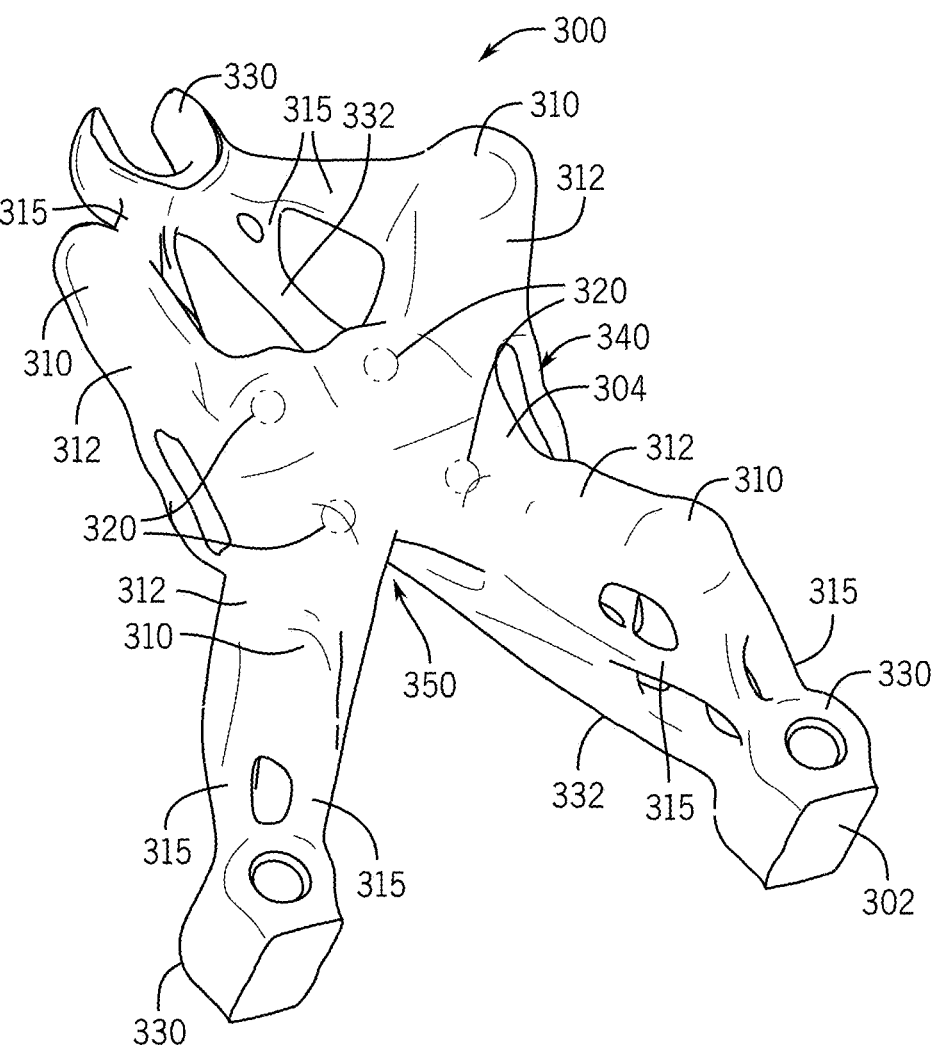
FIGS. 6A and 6B are axonometric first-side and second-side views of another configuration of the mounting bracket of FIG. 1.
Figure 6B:
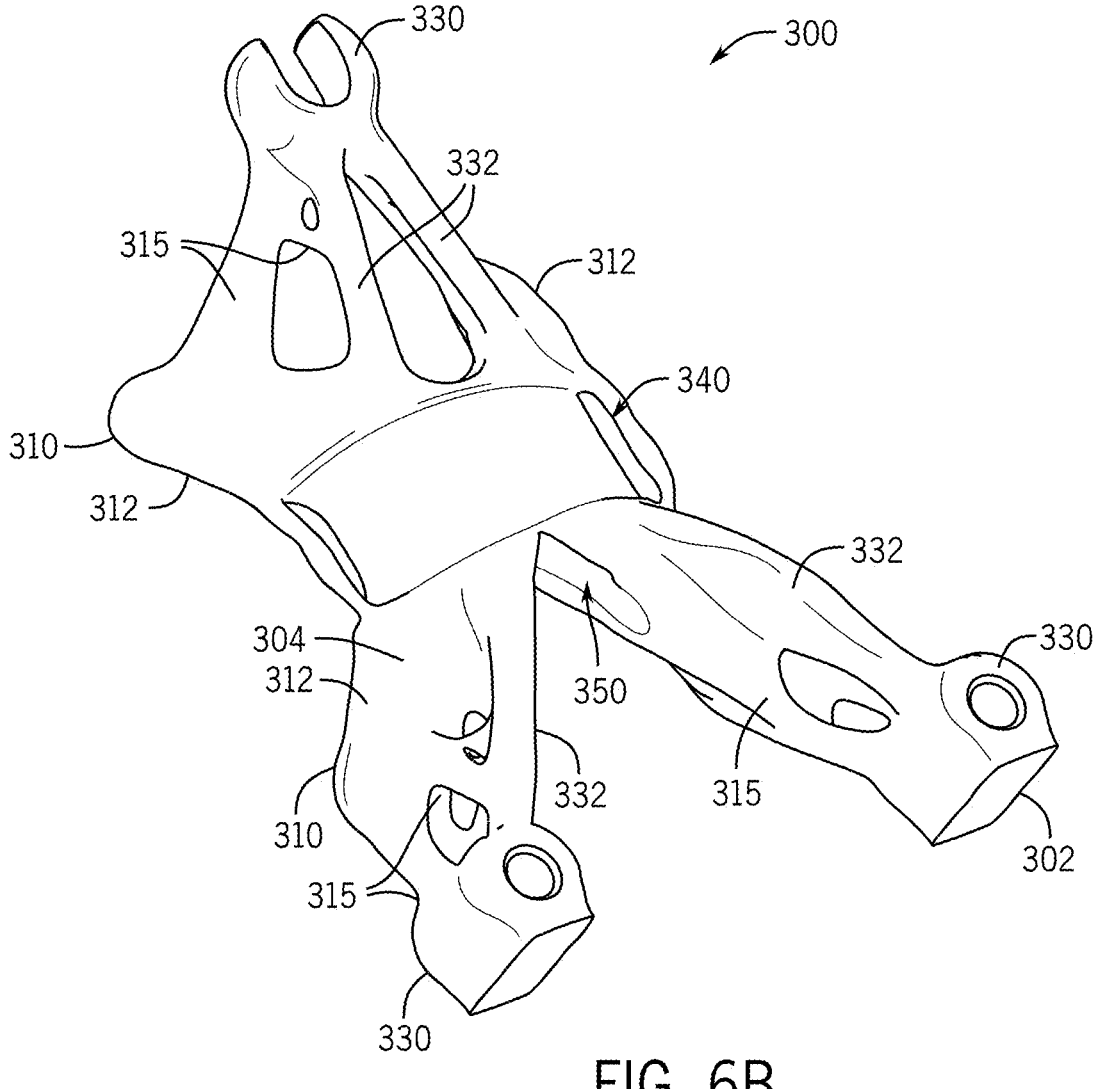
Figure 6C:
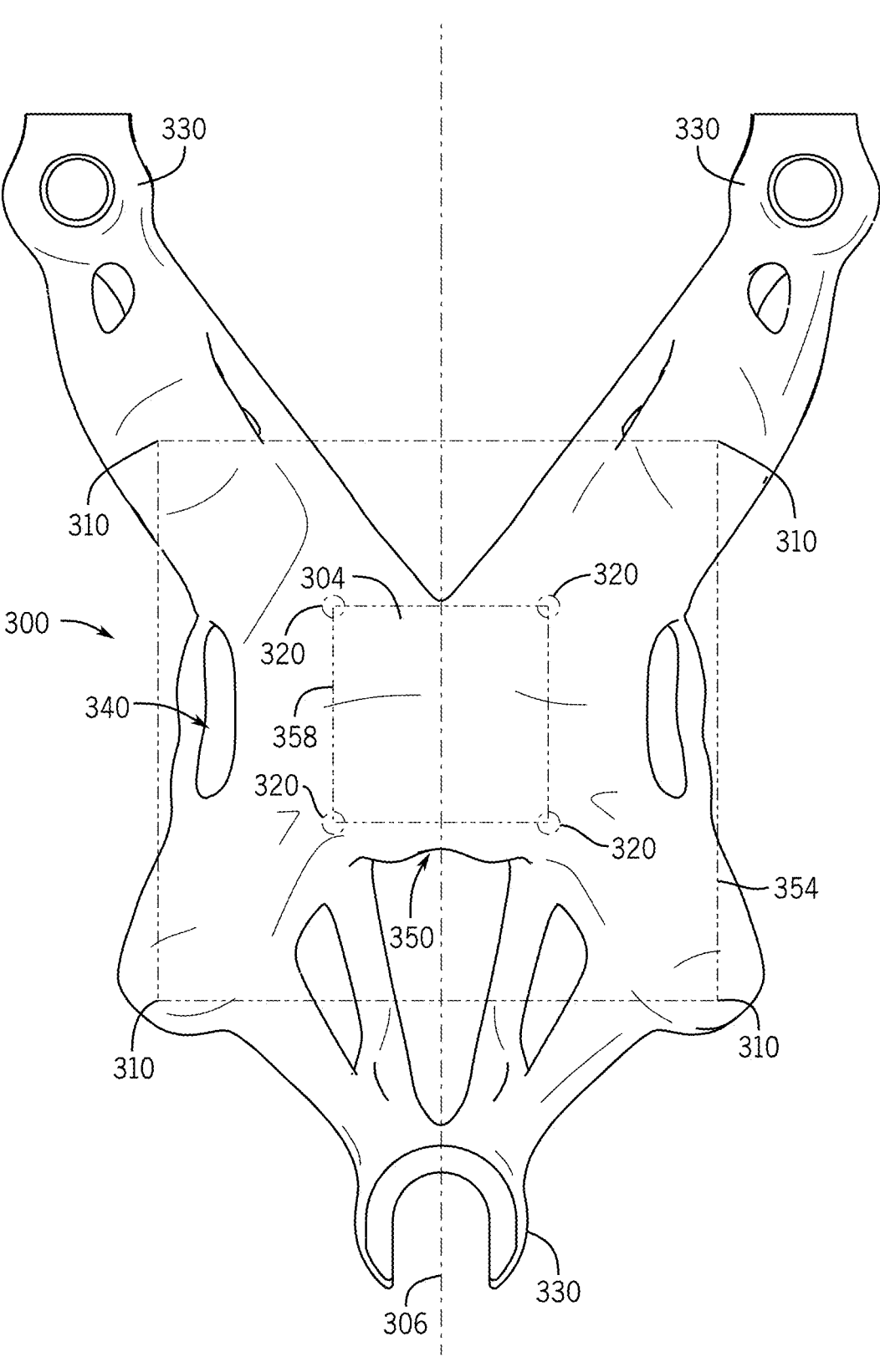
FIG. 6C is a first-side elevation plan view of the mounting bracket of FIGS. 6A and 6B.

FIGS. 6A through 6C illustrate another example configuration of the mounting bracket 100, indicated as mounting bracket 300. In particular, the bracket 300 includes a single-piece bracket body 302 that is integrally formed using metal additive manufacturing, although other examples can be investment cast or otherwise formed. Discussion of the mounting brackets 100, 200 above also generally applies to similarly oriented or numbered (in the 300 series) components of the mounting bracket 300, and vice versa, including relative to the bracket body 302, with a main body 304 having a central axis 306, channel structures 340, 350, arms 312, 332, contact surfaces 310, 320, and mounting blocks 330. Correspondingly, as discussed relative to the mounting brackets 100, 200, the mounting bracket 300 can be used to adaptably mount various devices to pipes or other objects (e.g., as shown in FIGS. 7A through 8B), with the contact surfaces 310, 320 variously engaged.

As variously discussed herein, the disclosed mounting bracket can include separate sets of contact surfaces to engage pipes of differing diameters. For example, as shown in FIG. 6A, the contact surfaces 310 extend away from the main body 304 of bracket body 302 to define an outer contact zone. The contact surfaces 320 also extend from the main body 304 of the bracket body 302, in the same direction of the first set of contact surfaces 310, to define an inner contact zone. Correspondingly, as further discussed below, the contact surfaces 310 are spaced apart from each other to simultaneously engage a pipe with a first (larger) diameter and the contact surfaces 320 are spaced apart from each other to simultaneously engage a pipe with a second (smaller) diameter.

In particular, in the illustrated example, the first contact surfaces 310 are supported on the first arms 312 that extend from the main body 304 of the bracket body 302 to the first side of the bracket body. Thus, for example, the first contact surfaces 310 can be spaced relatively widely apart from each other, without substantial addition of material to the bracket body 302. In contrast, the second contact surfaces 320 protrude as continuous topographical contours of the main body 304. Thus, the second contact surfaces 320 can be spaced relatively closely together.

In the illustrated example, the first arms 312 are symmetrically arranged and angle away from the main body 304. The arms 312 are also generally formed with relatively wide profiles, extending as wings from the main body 304 to the contact surfaces 310. Further, as similarly discussed above relative to FIGS. 5A and 5B, the arms 312 can be supported and extended by variously formed extensions 315, including so as to provide multi-strut support for the mounting blocks 330. In particular, the mounting bracket 300 also includes two of the arms 332 to support one of the mounting blocks 330, in combination with multiple of the extensions 315 of the adjacent arms 312. However, other configurations are possible in other examples.

In some examples, the first and second contract surfaces 310, 320 can be symmetrical arranged about an axis (e.g., longitudinal or elongate centerline) 306 of the main body 304. This configuration can provide improved strength and adaptability to different pipes and installed orientations, as well as generally simple installation operations for users (e.g., relative to alignment and securement of the bracket 300).

Further, one or more (e.g., each) of the four respective contact profiles of the contact surfaces 310, 320 can formed as spherical surfaces (i.e., as surfaces that at least partly include a spherical contour) to provide secure and adaptable contact with a variety of pipe diameters and with the bracket body 302 in a variety of orientations. However, in other examples other profiles are possible, including other rounded (e.g., ovoid) surfaces.

Now referring to FIG. 6C, in particular, the first contact surfaces 310 are spaced apart from each other to define four contact points in the shape of a rectangle (i.e., a first contact rectangle), and a corresponding rectangular first contact zone 354 to engage a larger pipe. Similarly, the second contact surfaces 320 are spaced apart from each other to define four contact points also in the shape of a rectangle (i.e., a second contact rectangle), and a corresponding rectangular second contact zone 358 to engage a smaller pipe. Further, to provide a more compact profile, the second contact rectangle is fully enclosed within the first contact rectangle (from a perspective perpendicular to a plane corresponding to the second contact rectangle, i.e., into the page of FIG. 6C). This arrangement can also help with case and adaptability of installation, alone or in combination with the configuration of the first arms 312 of the body 304 generally.

In some cases, use of four contact points per set of contact surfaces can allow for secure attachment to a variety of objects (e.g., pipes of a variety of diameters, planar bodies, etc.) with the bracket body 302 adaptably arranged in various relative orientations. In other examples, however, different polygons or relative locations can be defined by otherwise spaced arrays of either of the contact surfaces 310, 320.

In the example shown, the mounting blocks 330 are formed as integral cylindrical bosses, extended from the first arms 312 to be spaced in three different directions from the main body 304 of the bracket body 302. The mounting blocks 330 can be threaded or otherwise configured to be securable to a relevant object, e.g., a gas meter or controller, and can thereby rigidly secure the object relative to a pipe engaged by the relevant contact surfaces 310, 320. Further, in some examples, one of more of the mounting blocks 330 can include an open-sided slot (e.g., as shown for one of the mounting blocks 330 in FIGS. 6A through 6C). With such an arrangement, for example, a fastener can be engaged within the mounting block 330 without threaded engagement (as appropriate) and without requiring the fastener to be first disengaged from other objects. In other examples, however, other configurations are possible, including mounting blocks formed as differently shaped bosses, as hooks or clasps, as channel structures for engagement with a strap to secure an auxiliary device, or otherwise.

As shown in FIGS. 7A through 8B, the channel structures 340, 350 can variously receive a strap (e.g., of pipe clamp) to urge the relevant contact surfaces 310, 320 into seated engagement with the relevant pipe. In this regard, as also discussed above, the mounting bracket 300 can be adaptably secured to pipes of a variety of sizes, with the mounting bracket 300 in a variety of orientations, to support auxiliary devices of a variety of types.

Figure 7A:
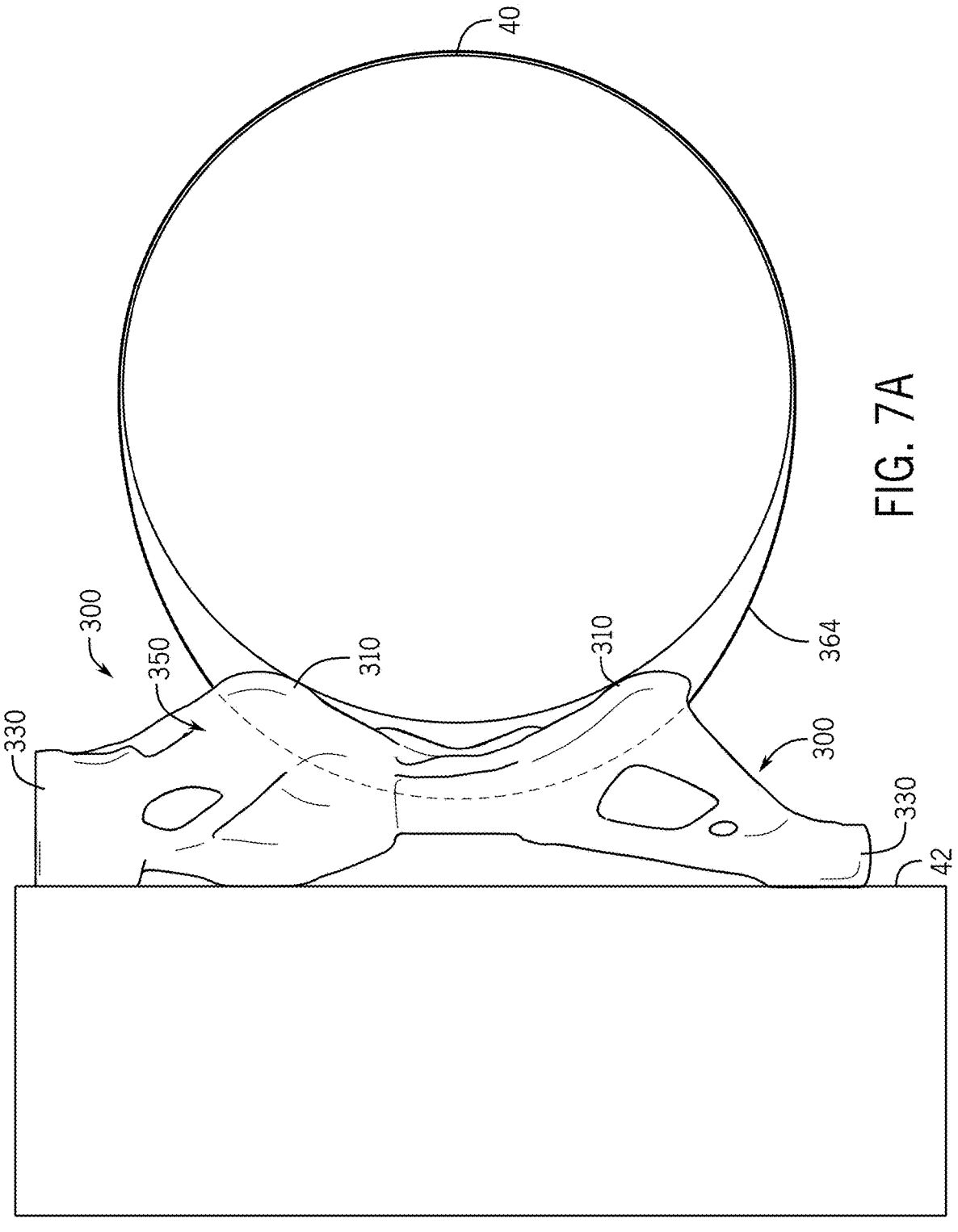
FIG. 7A is a side elevation view of the mounting bracket of FIGS. 6A and 6B arranged in a first orientation to secure an electrical enclosure to a first pipe.
Figure 7B:
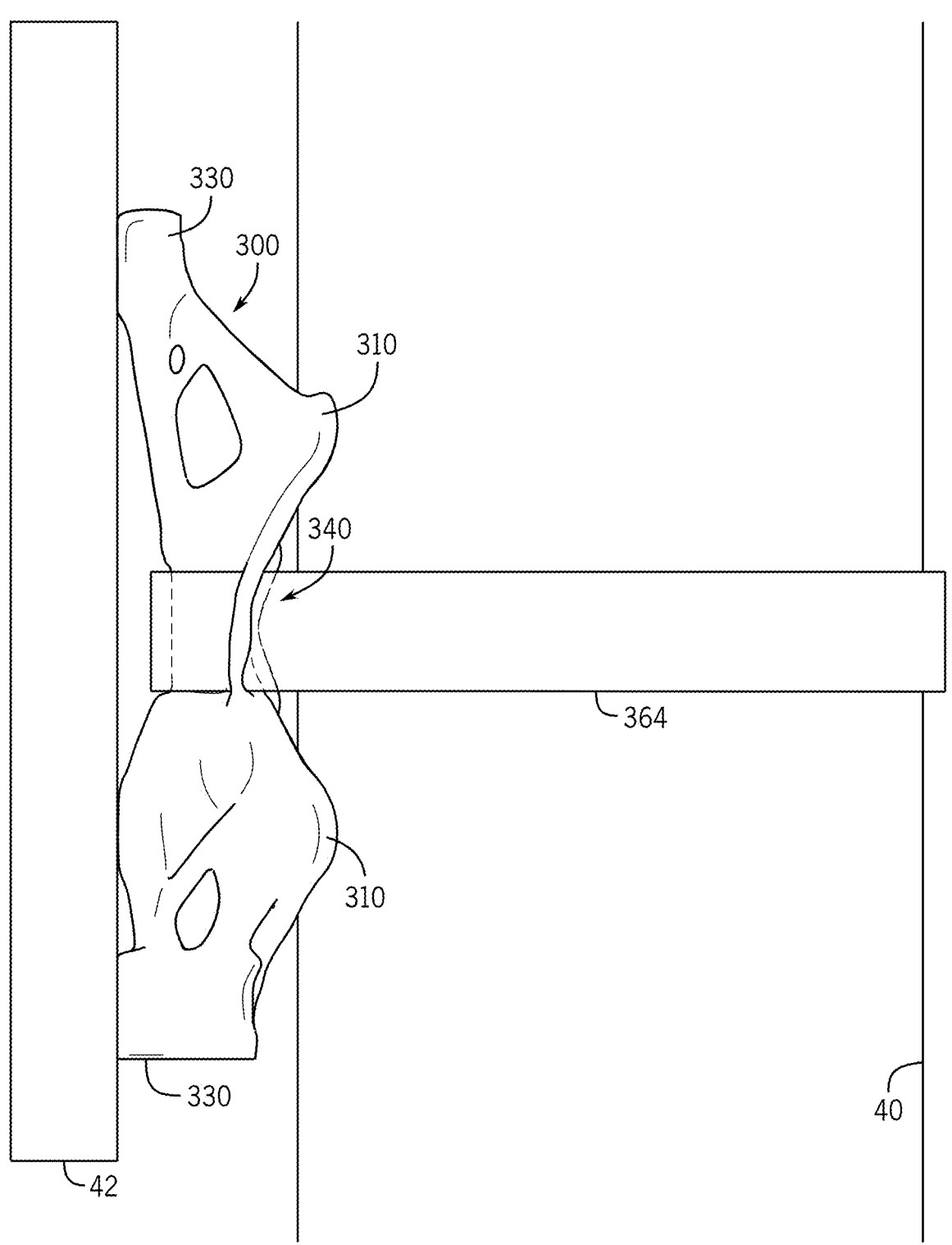
FIG. 7B is a side elevation view of the mounting bracket of FIGS. 6A and 6B arranged in a second orientation to secure an electrical enclosure to the first pipe.

As shown in FIG. 7A, the bracket 300 can be oriented transverse (e.g., perpendicular) to an axis of a larger pipe 40 (e.g., a 12-inch pipe), with the first contact surfaces 310 seated on the pipe 40 to securely locate and support the bracket 300. Further, a pipe strap 364 can extend through the channel 350, to secure the bracket 300 and an attached auxiliary device 42 to the pipe 40. As shown in FIG. 7B, the bracket 300 can alternatively (selectively) be oriented in parallel with the axis of the pipe 40, with the first contact surfaces 310 (differently) seated on the pipe 40 to securely locate and support the bracket 300. In this orientation, the pipe strap 364 can extend through the channel structure 340, to secure the bracket 300 and the auxiliary device 42 to the pipe 40.

Figure 8A:
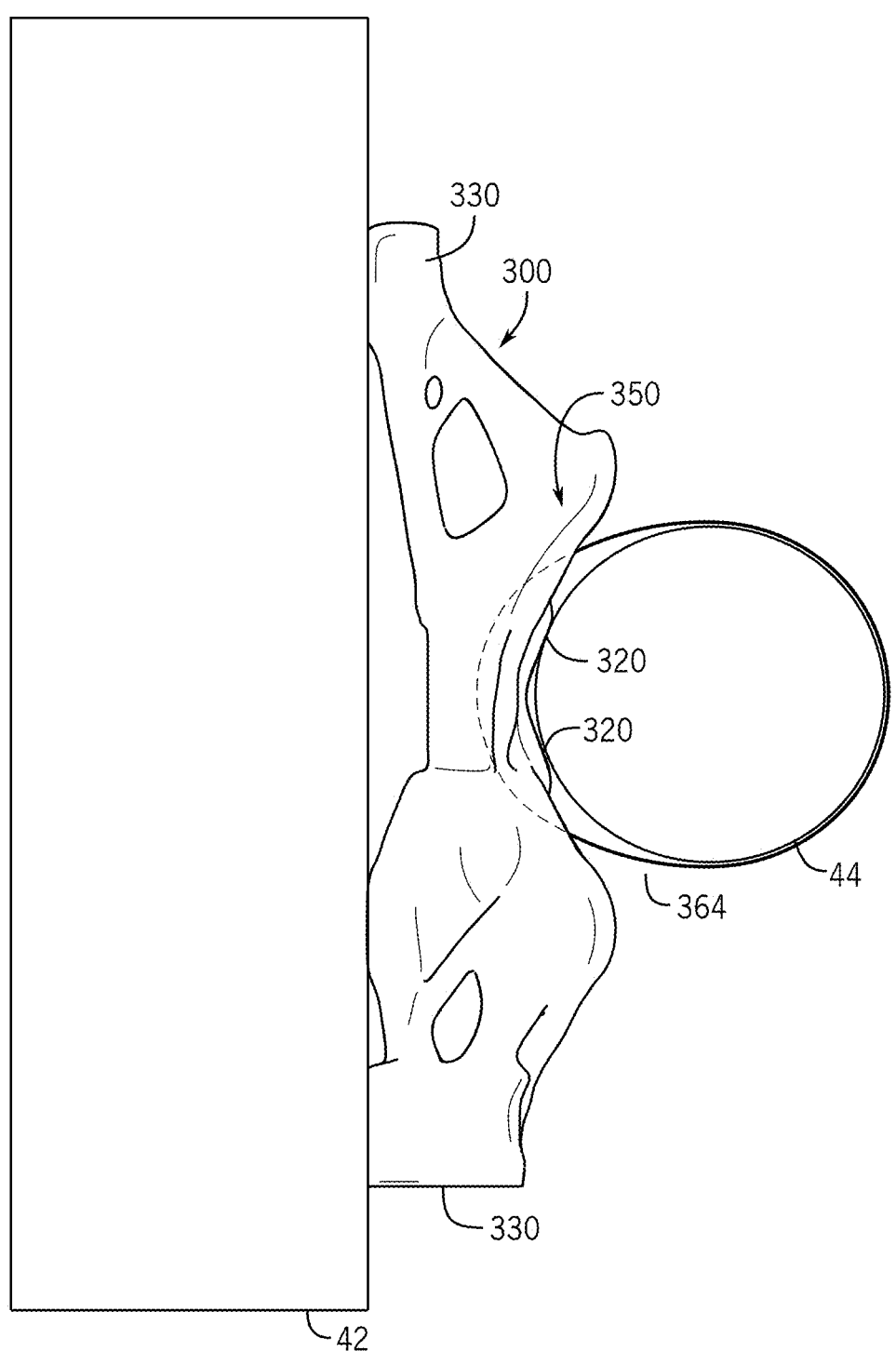
FIG. 8A is a side elevation view of the mounting bracket of FIGS. 6A and 6B arranged in a first orientation to secure an electrical enclosure to a second pipe.
Figure 8B:
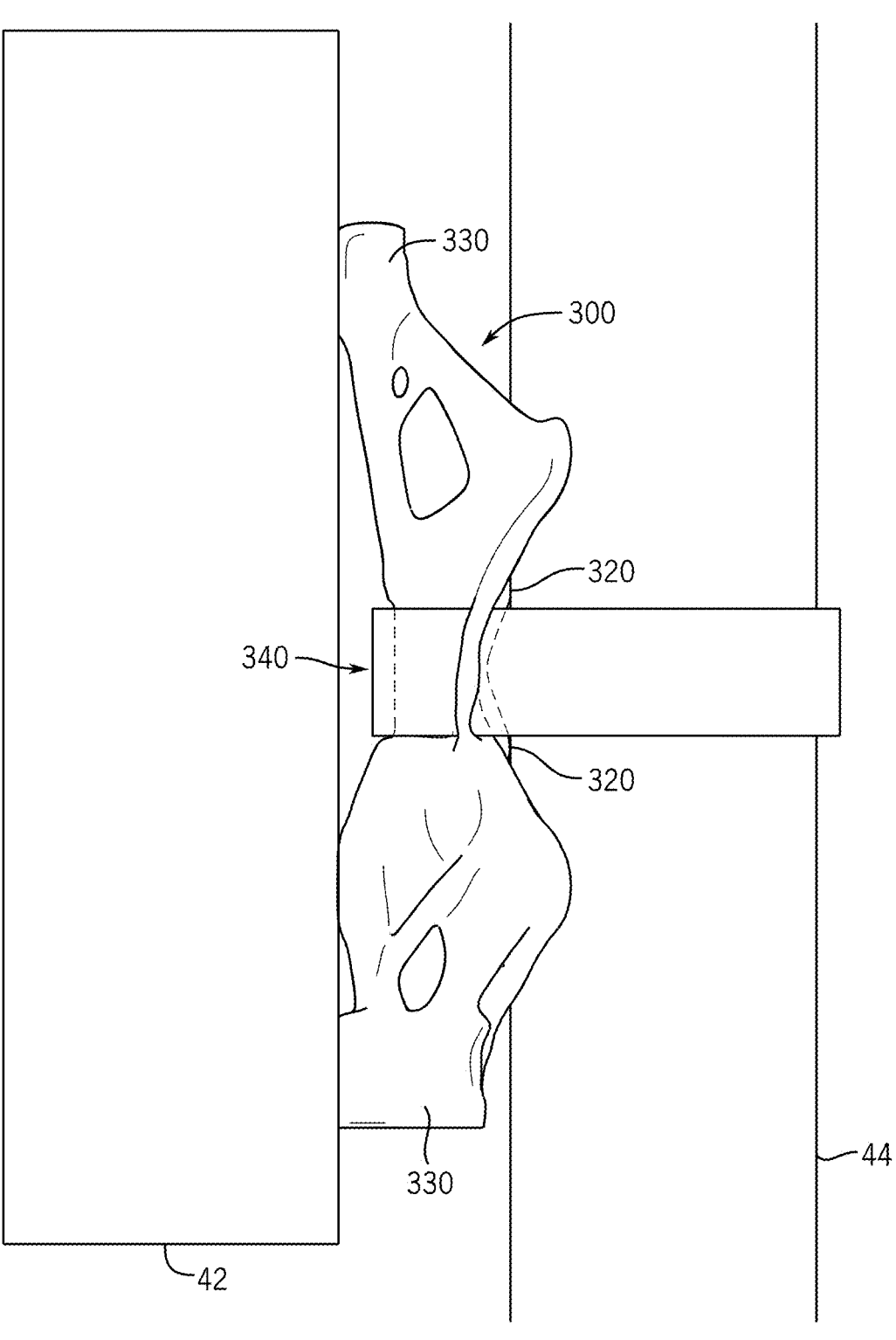
FIG. 8B is a side elevation view of the mounting bracket of FIGS. 6A and 6B arranged in a second orientation to secure an electrical enclosure to the second pipe.

As shown in FIG. 8A, the bracket 300 can be oriented transverse (e.g., perpendicular) to an axis of a smaller pipe 44 (e.g., a 2-inch pipe), with the second contact surfaces 320 seated on the pipe 44 to securely locate and support eh bracket 300. Further, the pipe strap 364 (or a different strap) can extend through the channel structure 350, to secure the bracket 300 and the attached auxiliary device 42 to the pipe 44. As shown in FIG. 8B, the bracket 300 can alternatively (selectively) be oriented in parallel with the axis of the pipe 44, with the second contact surfaces 320 (differently) seated on the pipe 44 to securely locate and support the bracket 300. In this orientation, the pipe strap 364 (shown transparently can extend through the channel structure 340, to secure the bracket 300 and the auxiliary device 42 to the pipe 44.

In different examples, a pipe strap 364 can be engaged with the bracket 300 before or after the bracket 300 is seated on a pipe. An auxiliary device or other object can likewise be secured to the bracket 300 before or after the bracket 300 is seated on or secured to a pipe.

Figure 9:
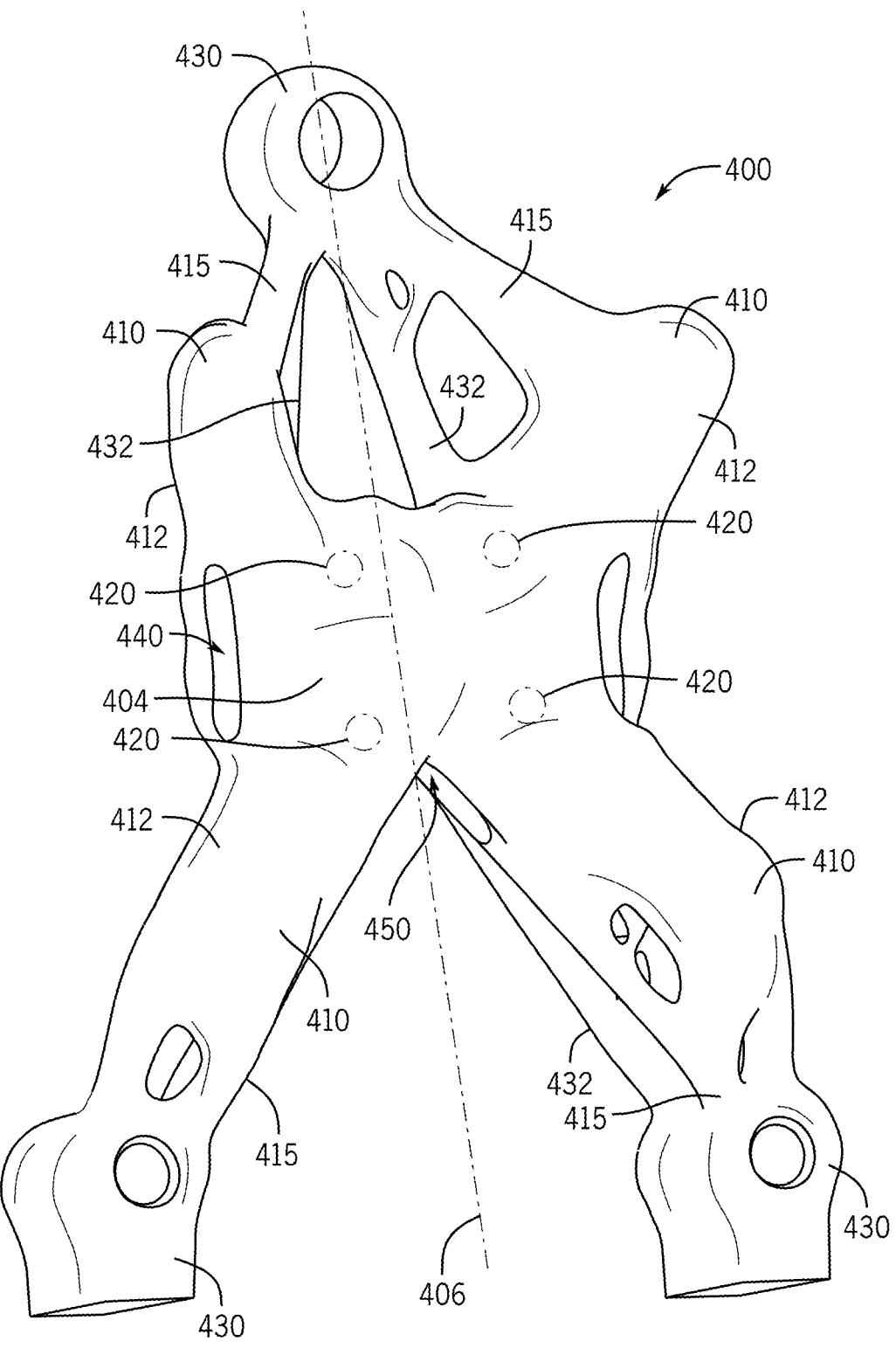
FIG. 9 is a first-side axonometric view of another configuration of the mounting bracket of FIGS. 6A and 6B.

FIG. 9 illustrates another configuration of the mounting bracket 100, indicated as mounting bracket 400. Accordingly, discussion of the mounting brackets 100, 200, 300 above also generally applies to similarly oriented or numbered (in the 400 series) components of the mounting bracket 400, and vice versa, including relative to an integrally (e.g., additively) formed bracket body 402, with a main body 404 having a central axis 406, channel structures 440, 450, arms 412, 432, contact surfaces 410, 420, and mounting blocks 430. Correspondingly, as discussed relative to the mounting brackets 100, 200, 300, the mounting bracket 400 can be used to adaptably mount various devices to pipes or other objects, with the contact surfaces 410, 420 variously engaged.

In particular, the mounting bracket 400 is configured similarly to the mounting bracket 300, with various extensions 415 to support the arms 412, 432. In contrast to the mounting bracket 300, however, each of the mounting blocks 430 includes a closed-sided bore (e.g., for threaded engagement with a corresponding fastener). In other examples, other configurations for the mounting blocks 430 are also possible, including with an open-sided slot in any combination of one or more of the mounting blocks 430.

Figure 10A:
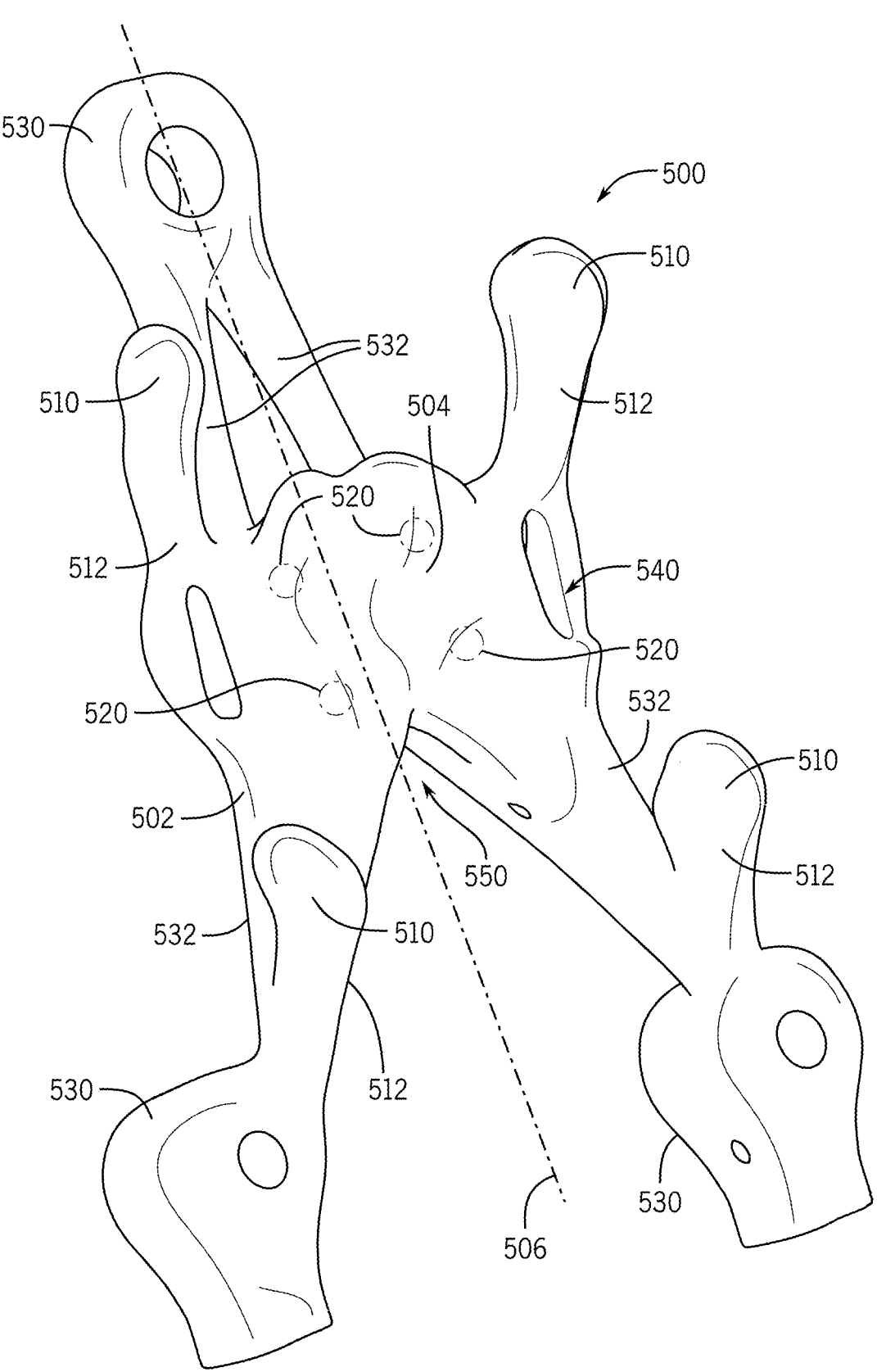
FIGS. 10A and 10B are first-side and second-side axonometric view of another configuration of the mounting bracket of FIG. 1.
Figure 10B:
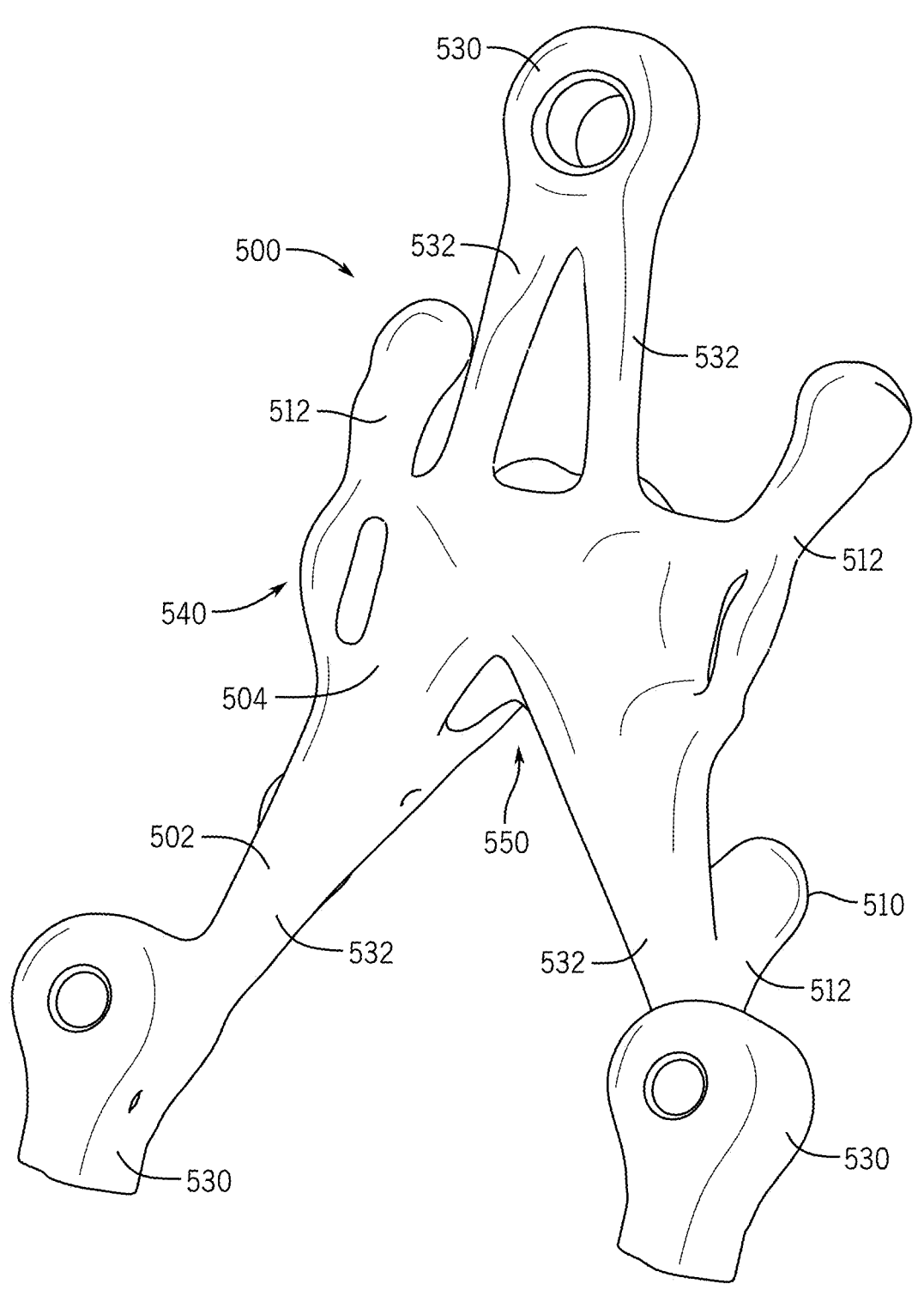

FIGS. 10A and 10B illustrate another configuration of the mounting bracket 100, indicated as mounting bracket 500. Accordingly, discussion of the mounting brackets 100, 200, 300, 400 above also generally applies to similarly oriented or numbered (in the 500 series) components of the mounting bracket 500, and vice versa, including relative to an integrally (e.g., additively) formed bracket body 502, with a main body 504 having a central axis 506, channel structures 540, 550, arms 512, 532, contact surfaces 510, 520, and mounting blocks 530. Correspondingly, as discussed relative to the mounting brackets 100, 200, 300, 400, the mounting bracket 500 can be used to adaptably mount various devices to pipes or other objects, with the contact surfaces 510, 520 variously engaged.

In some implementations, devices or systems disclosed herein can be utilized, manufactured, installed, etc. using methods embodying aspects of the disclosed technology. Correspondingly, any description herein of particular features, capabilities, or intended purposes of a device or system should be considered to disclose, as examples of the disclosed technology a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, should be understood to disclose, as examples of the disclosed technology, the utilized features and implemented capabilities of such device or system.

In this regard, in some examples, it may be useful to form a mounting bracket with support structures for manufacturing, including support structures that can be removed before service. Such approaches, for example, can help to ensure sufficient strength of a part during additive manufacturing, reduce deformation, and provide for simpler post-processing operations, among other benefits.

Figure 11A:
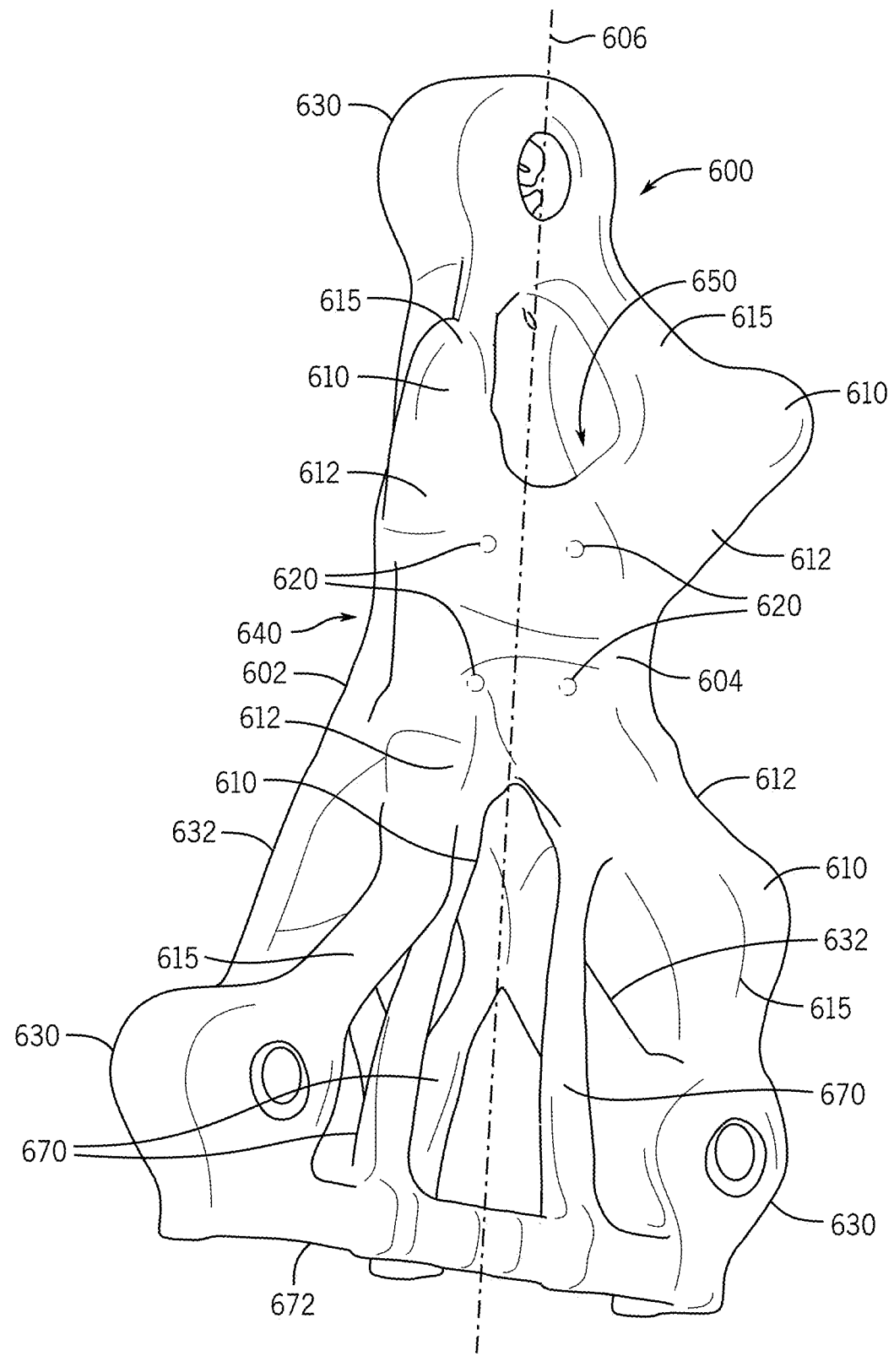
FIGS. 11A and 11B are first-side and second-side axonometric views of another configuration of the mounting bracket of FIG. 1, in an initially manufactured configuration.
Figure 11B:
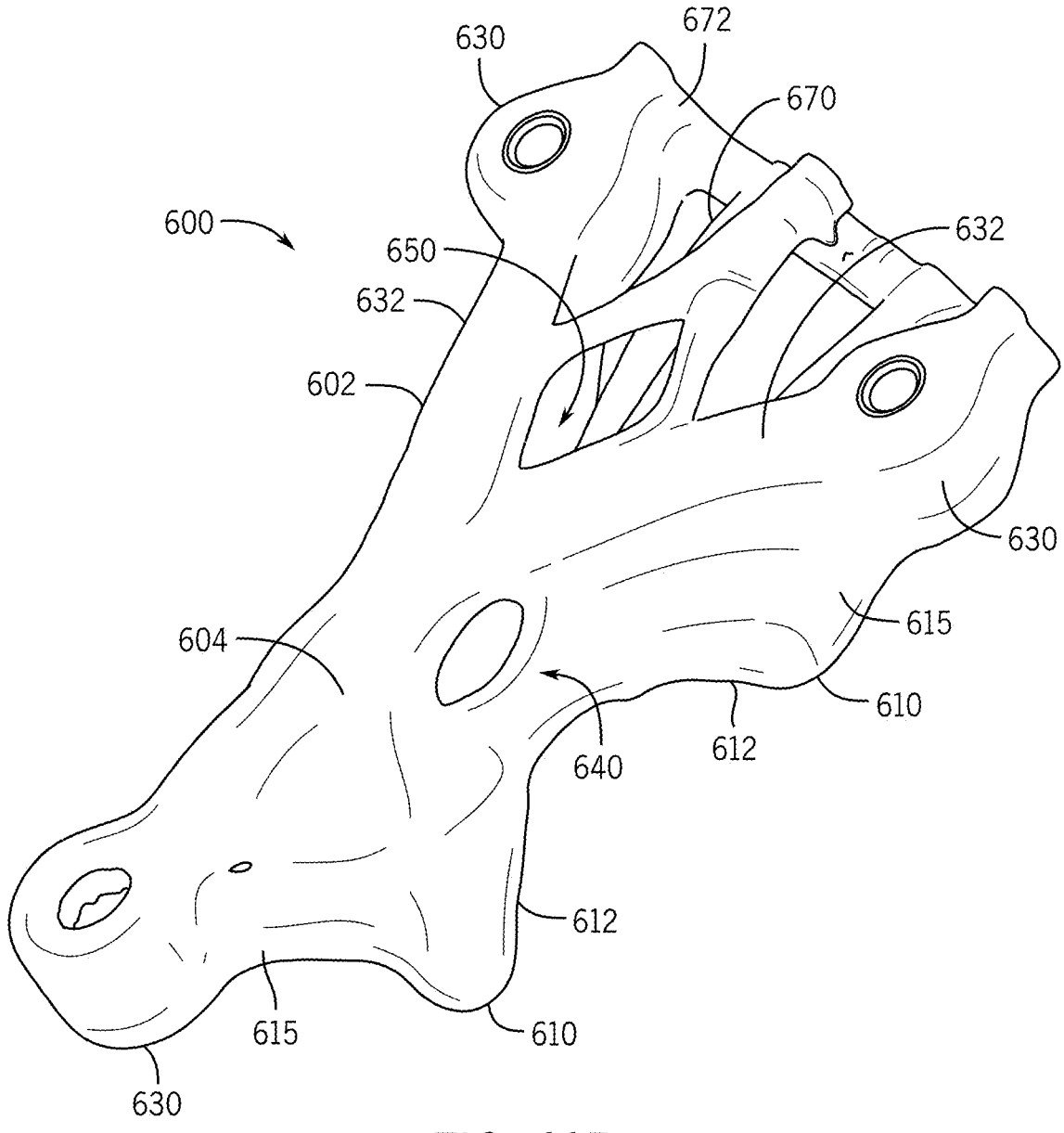

In this regard, for example, FIGS. 11A and 11B illustrate another configuration of the mounting bracket 100, indicated as mounting bracket 600. Accordingly, discussion of the mounting brackets 100, 200, 300, 400, 500 above also generally applies to similarly oriented or numbered (in the 600 series) components of the mounting bracket 600, and vice versa, including relative to an integrally (e.g., additively) formed bracket body 602, with a main body 604 having a central axis 606, channel structures 640, 650, arms 612, 632, contact surfaces 610, 620, and mounting blocks 630. Correspondingly, as discussed relative to the mounting brackets 100, 200, 300, 400, 500, the mounting bracket 600 can be used to adaptably mount various devices to pipes or other objects, with the contact surfaces 610, 620 variously engaged.

In particular, the mounting bracket 600 is similar to the mounting bracket 300 (see, e.g., FIGS. 6A through 6C), with the arms 612 formed as wings, and various extension 615 of the wing material extend to support the mounting blocks 630. In the configuration shown, the mounting bracket 600 is formed during additive manufacturing to include support legs 670 that extend from a base pad 672 (e.g., with the base pad 672 providing a starting point and overall support structure during additive manufacturing). The support legs 670, for example, can extend from the base pad 672 to the main body 604 or to various other structures (e.g., the arms 632) as columnar, bifurcated, or other supports. In some cases, inclusion of the support legs 670 can correspondingly provide for improved manufacturing, although the legs 670 may be removed before service in some cases (e.g., along with the base pad 672), or the bracket body 602 may be otherwise subject to various post-processing operations.

Although particular examples have been illustrated and discussed above, variations on the illustrated and described examples are possible. For example, in addition to variations noted above, some brackets can be formed with additional hollow areas to reduce material usage and weight. In some examples, rubber or other elastomers can be over-molded onto a bracket or otherwise arranged to provide a cushion or increased friction between the bracket and a pipe. Further, some examples can include channel structures that define multiple channels (e.g., multiple parallel channels) to secure a bracket to a pipe in a particular orientation. Accordingly, for example, significant loads can be adequately supported with multiple pipe straps, as needed.

Thus, examples of the disclosed technology can provide an improvement over conventional arrangements for securing auxiliary devices relative to piping systems. For example, some brackets according to the disclosed configurations can be used to adaptably secure a wide range of objects to pipes of a wide range of diameters.

As used herein, unless otherwise specified or limited, the terms "mounted," "connected," "supported," "secured," and "coupled" and variations thereof, as used with reference to physical connections, are used broadly and encompass both direct and indirect mountings, connections, supports, and couplings. Further, unless otherwise specified or limited, "connected," "attached," or "coupled" are not restricted to physical or mechanical connections, attachments, or couplings.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon, e.g., "at least one of") and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise limited or defined, "integral" and derivatives thereof (e.g., "integrally") describe elements that are manufactured as a single piece without fasteners, adhesive, or the like to secure separate components together. For example, an element that is stamped, cast, or otherwise molded as a single-piece component from a single piece of sheet metal or other continuous single piece of material, without rivets, screws, other fasteners, or adhesive to hold separately formed pieces together, is an integral (and integrally formed) element. In contrast, an element formed from multiple pieces that are separately formed initially then later connected together, is not an integral (or integrally formed) element. Some integrally formed components can be additively formed, with any variety of known processes to sequentially add layers of material to an integrally formed body using 3D printers or other equipment.

Also as used herein, unless otherwise limited or defined, the terms "about," "approximately," and "substantially" as used herein with respect to a reference vale refer to variations from the reference value of +5%, inclusive.

Also as used herein, "transverse" indicates directions that are not parallel to a reference direction. Correspondingly, some transverse directions may be perpendicular or substantially perpendicular (i.e., within +12% of perpendicular, inclusive) to the relevant reference direction.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A mounting bracket to secure an object to a pipe, the mounting bracket comprising a bracket body that includes:

a first set of contact surfaces, including first rounded contact profiles that protrude to a first side of the bracket body and are spaced to simultaneously engage a pipe with a first diameter;

a second set of contact surfaces, including second rounded contact profiles that protrude to the first side of the bracket body and are spaced to simultaneously engage a pipe with a second diameter smaller than the first diameter;

mounting blocks arranged to secure the object to a second side of the bracket body that is opposite the first side;

a first channel structure that receives a strap to secure the bracket body to a pipe with the bracket body in a first orientation; and a second channel structure that extends transverse to the first channel structure and receives a strap to secure the bracket body to a pipe with the bracket body in a second orientation different from the first orientation.

2. The mounting bracket of claim 1, wherein at least one of the first and second channel structures defines a corresponding channel on the second side of bracket body.

3. The mounting bracket of claim 1, wherein the first set of contact surfaces are supported on first arms that protrude from a main body of the bracket body to the first side of the bracket body.

4. The mounting bracket of claim 3, wherein the second set of contact surfaces protrude as contours of the main body.

5. The mounting bracket of claim 3, wherein the first channel structure extends through at least two of the first arms.

6. The mounting bracket of claim 1, wherein each of the first and second sets of contact surfaces includes a respective plurality of spherical contact surfaces.

7. The mounting bracket of claim 1, wherein the first set of contact surfaces define a first contact rectangle to engage a pipe of the first diameter; and wherein the second set of contact surfaces define a second contact rectangle, smaller than the first contact rectangle, to engage a pipe of the second diameter smaller than the first diameter.

8. The mounting bracket of claim 7, wherein, from a perspective perpendicular to a plane corresponding to the second contact rectangle, the second contact rectangle is enclosed within the first contact rectangle.

9. The mounting bracket of claim 1, wherein the mounting blocks are supported on second arms that protrude from a main body of the bracket body to the second side of the bracket body.

10. The mounting bracket of claim 9, wherein the mounting blocks include one or more of:

a boss configured to threadedly secure the object to the mounting bracket; or an open-sided slot.

11. The mounting bracket of claim 1, wherein the bracket body is an integrally formed body.

12. A method of securing an object to a pipe, the method comprising:

selectively aligning a mounting bracket for the object in either of a first orientation or a second orientation relative to a pipe, with:

in the first orientation, a central axis of a main body of the mounting bracket oriented transverse to an axis of the pipe; and in the second orientation, the central axis of the main body oriented along an axis of the pipe; and securing the mounting bracket to the pipe in the selected first or second orientation by:

in the first orientation, securing around the pipe a strap that extends through a first channel structure defined by the main body; or in the second orientation, securing around the pipe a strap that extends through a second channel structures defined by the main body.

13. The method of claim 12, wherein, with the pipe having a first diameter, securing the strap around the pipe engages a bracket body of the mounting bracket with the pipe at a first set of contact surfaces, including first rounded contact profiles that protrude to a first side of the bracket body; and wherein, with the pipe having a second diameter smaller than the first diameter, securing the strap around the pipe engages the bracket body with the pipe at a second set of contact surfaces, including second rounded contact profiles that protrude to a first side of the bracket body.

14. The method of claim 13, wherein the first set of contact surfaces define an outer contact zone and the second set of contact surfaces define an inner contact zone at least partly contained within the outer contact zone.

15. A mounting bracket to secure an object to a pipe, the mounting bracket comprising:

an integrally formed bracket body that includes:

a first set of contact surfaces, on a first side of the bracket body, spaced to simultaneously engage a pipe with a first diameter;

a second set of contact surfaces, on the first side of the bracket body, spaced to simultaneously engage a pipe with a second diameter smaller than the first diameter;

at least one mounting block arranged to secure the object to a second side of the bracket body that is opposite the first side;

a first channel structure configured to receive a strap in a first direction to secure the bracket body to a pipe with the bracket body in a first orientation; and a second channel structure configured to receive a strap in a second direction transverse to the first direction to secure the bracket body to the pipe with the bracket body in a second orientation different from the first orientation.

16. The mounting bracket of claim 15, wherein the first set of contact surfaces include at least four contact surfaces.

17. The mounting bracket of claim 16, wherein the second set of contact surfaces includes at least four contact surfaces.

18. The mounting bracket of claim 17, wherein one or more of:

the at least four contact surfaces of the first set define a first contact rectangle; or the at least four contact surfaces of the second set define a second contact rectangle.

19. The mounting bracket of claim 15, wherein the at least one mounting block is supported by an arm of the bracket body.

20. The mounting bracket of claim 15, wherein the first set of contact surfaces are defined on a plurality of arms of the bracket body.

* * * * *